US009581233B2

(12) United States Patent
Manzoor

(10) Patent No.: US 9,581,233 B2
(45) Date of Patent: Feb. 28, 2017

(54) TORSIONAL VIBRATION DAMPER WITH AN INTERLOCKED ISOLATOR

(71) Applicant: Suhale Manzoor, Plymouth, MI (US)

(72) Inventor: Suhale Manzoor, Plymouth, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 129 days.

(21) Appl. No.: 14/734,750

(22) Filed: Jun. 9, 2015

(65) Prior Publication Data

US 2015/0354689 A1 Dec. 10, 2015

Related U.S. Application Data

(60) Provisional application No. 62/009,443, filed on Jun. 9, 2014, provisional application No. 62/111,844, filed on Feb. 4, 2015.

(51) Int. Cl.
*F16H 55/36* (2006.01)
*F16F 15/12* (2006.01)
(Continued)

(52) U.S. Cl.
CPC ........ *F16H 55/36* (2013.01); *F16F 15/126* (2013.01); *F16F 15/1209* (2013.01); *F16F 15/1442* (2013.01); *F16H 2055/366* (2013.01)

(58) Field of Classification Search
CPC F16H 55/36; F16H 2055/366; F16F 15/1209; F16F 15/126; F16F 15/1442
See application file for complete search history.

(56) References Cited

U.S. PATENT DOCUMENTS 1,872,136 A 8/1932 Gibson
2,204,953 A 6/1940 Wittmer
(Continued)

FOREIGN PATENT DOCUMENTS

CN 102601267 7/2012
EP 1645783 4/2006
WO 2014/152465 9/2014

OTHER PUBLICATIONS

US, Non-Final Office Action; U.S. Appl. No. 14/789,099 (Nov. 1, 2016).
(Continued)

*Primary Examiner* — William E Dondero
*Assistant Examiner* — Robert T Reese
(74) *Attorney, Agent, or Firm* — Thompson Hine LLP

(57) ABSTRACT

Torsional vibration dampers having isolator members (crankshaft damper-isolators) are disclosed that include a hub defining an annular receptacle, a pulley body having a belt engaging surface, a damper assembly disposed between an outermost radial surface of the hub and the pulley body, an isolator member seated in the annular receptacle of the hub, and a slide bearing disposed between an outer radial surface of the hub and the sleeve of the pulley body. The isolator member is engaged with both the hub and the pulley body for rotation therewith when the hub and pulley body rotate at the same speed and when the hub rotates relative to the pulley body. The isolator member may be an elastomeric isolator or a torsion spring isolator. The slide bearing axially retains the pulley body to the hub and allows the pulley body to rotate relative to the hub.

19 Claims, 5 Drawing Sheets

(51) Int. Cl.
*F16F 15/126* (2006.01)
*F16F 15/14* (2006.01)

(56) References Cited

U.S. PATENT DOCUMENTS

| | | | |
|---|---|---|---|
| 2,672,907 A | 3/1954 | MacLean | |
| 2,674,897 A | 4/1954 | Heinish | |
| 3,479,907 A | 11/1969 | Hall | |
| 3,485,063 A | 12/1969 | Behlmer | |
| 3,504,509 A | 4/1970 | Paulsen | |
| 4,041,803 A | 8/1977 | Goloff et al. | |
| 4,355,990 A | 10/1982 | Duncan, Jr. | |
| 4,378,865 A | 4/1983 | McLean | |
| 4,710,152 A | 12/1987 | Ichikawa et al. | |
| 5,308,289 A | 5/1994 | Funahashi | |
| 5,377,962 A | 1/1995 | Ochs et al. | |
| 5,405,296 A | 4/1995 | Cerny et al. | |
| 5,452,622 A | 9/1995 | Fenelon | |
| 5,540,626 A | 7/1996 | Asai et al. | |
| 5,562,544 A | 10/1996 | Ochs et al. | |
| 5,573,461 A | 11/1996 | Colford | |
| RE35,932 E | 10/1998 | Cerny et al. | |
| 5,931,052 A | 8/1999 | Zhao et al. | |
| 5,988,015 A | 11/1999 | Riu | |
| 6,026,709 A | 2/2000 | Depp et al. | |
| 6,062,104 A | 5/2000 | Allport | |
| 6,065,943 A | 5/2000 | Suito et al. | |
| 6,106,421 A | 8/2000 | Graber et al. | |
| 6,332,842 B1 | 12/2001 | Tabuchi et al. | |
| 6,702,681 B1 | 3/2004 | Ochs | |
| 6,742,412 B2 | 6/2004 | Feldhaus et al. | |
| 6,955,252 B2 | 10/2005 | Allport | |
| 7,025,680 B2 | 4/2006 | Tabuchi et al. | |
| 7,055,243 B2 | 6/2006 | Hodjat et al. | |
| 7,204,772 B2 | 4/2007 | Huber | |
| 7,300,372 B2 | 11/2007 | Riu | |
| 7,591,357 B2 | 9/2009 | Antchak et al. | |
| 7,658,127 B2 | 2/2010 | Crist | |
| 7,713,156 B2 | 5/2010 | Sakura et al. | |
| 7,850,557 B2 | 12/2010 | Moriya et al. | |
| 7,891,475 B2 | 2/2011 | Zhu et al. | |
| 7,892,124 B2 | 2/2011 | Hodjat et al. | |
| 7,931,538 B2 | 4/2011 | Martinek et al. | |
| 8,021,253 B2 | 9/2011 | Dell et al. | |
| 8,038,554 B2 | 10/2011 | Watanabe et al. | |
| 8,202,183 B2 | 6/2012 | Riu | |
| 8,231,488 B2 | 7/2012 | Amati et al. | |
| 8,302,753 B2 | 11/2012 | Antchak et al. | |
| 8,313,400 B2 | 11/2012 | Serkh et al. | |
| 8,506,434 B2 | 8/2013 | Harvey | |
| 8,534,438 B2 | 9/2013 | Antchak et al. | |
| 2003/0199348 A1 | 10/2003 | Huber | |
| 2004/0166974 A1 | 8/2004 | Hodjat | |
| 2006/0094547 A1* | 5/2006 | Xu | F16F 15/126 474/94 |
| 2006/0172832 A1* | 8/2006 | Watanabe | F16F 15/126 474/94 |
| 2006/0264282 A1 | 11/2006 | Moriya et al. | |
| 2007/0037644 A1 | 2/2007 | Mevissen et al. | |
| 2007/0209899 A1 | 9/2007 | Liu et al. | |
| 2007/0249442 A1 | 10/2007 | Grunau et al. | |
| 2009/0000422 A1 | 1/2009 | Christenson et al. | |
| 2009/0105021 A1 | 4/2009 | Amati et al. | |
| 2009/0223775 A1 | 9/2009 | Hodjat et al. | |
| 2009/0318252 A1 | 12/2009 | Riu | |
| 2010/0099527 A1 | 4/2010 | Rolando et al. | |
| 2011/0263365 A1 | 10/2011 | Mende et al. | |
| 2012/0015768 A1 | 1/2012 | Serkh et al. | |
| 2012/0094791 A1 | 4/2012 | Lee | |
| 2012/0149511 A1 | 6/2012 | Hodjat | |
| 2012/0172163 A1 | 7/2012 | Fitz | |
| 2012/0231909 A1 | 9/2012 | Shin | |
| 2013/0284139 A1 | 10/2013 | Staley | |
| 2016/0153542 A1* | 6/2016 | Wick | F16H 55/36 474/94 |

OTHER PUBLICATIONS

PCT, International Search Report and Written Opinion; Application No. PCT/US2015/034788 (Aug. 21, 2015).

* cited by examiner

TORSIONAL VIBRATION DAMPER WITH AN INTERLOCKED ISOLATOR

RELATED APPLICATIONS

This application claims the benefits of U.S. Provisional Application No. 62/009,443, filed on Jun. 9, 2014, and U.S. Provisional Application No. 62/111,844, filed on Feb. 4, 2015, both of which are incorporated by reference herein in their entirety.

TECHNICAL FIELD

The present invention relates to torsional vibration dampers for vehicle engines and, more particularly, to torsional vibration dampers having a spring isolator that does not require being molded, bonded, or adhered to another component.

BACKGROUND

Originally a crankshaft drove the front end assembly drive (FEAD) system of an engine. The crankshaft was turned by the firing of pistons, which exerted a rhythmic torque on the crankshaft, rather than being continuous. This constant application and release of torque caused vacillations, which would stress the crankshaft to the point of failure. Stated another way the crankshaft is like a plain torsion-bar, which has a mass and a torsional spring rate, that causes the crankshaft to have its own torsional resonant frequency. The torque peaks and valleys plus the inertia load from the acceleration of the reciprocating components causes the crankshaft itself to deflect (rotationally) forward and backward while it is operating. When those pulses are near the crankshaft resonant frequency, they would cause the crank to vibrate uncontrollably and eventually break. Accordingly, a torsional vibration damper (sometimes referred to as a crankshaft damper) is mounted on the crankshaft to solve this problem by counteracting torque to the crank, negating the torque twisting amplitude placed upon the crankshaft by periodic firing impulses, and to transfer rotational motion into the FEAD system, typically by driving an endless power transmission belt.

While existing torsional vibration dampers have been effective to extend the life of the crankshaft and to drive the FEAD system, changes in vehicle engine operation, such as the introduction of start-stop systems to conserve fuel consumption, add complexities to the system that the existing torsional vibration dampers are not designed to address. For instance, the start-stop system introduces impact forces due to belt starts that introduce potential slip in the elastomer-metal interface in traditional torsion vibration dampers. Another concern is maintaining good axial and radial run-outs between the metallic components.

Also, starting and stopping causes the crankshaft to experience rigid body modes of vibration, which are transmitted through the torsion vibration damper to the FEAD. During starting and stopping conditions, the crankshaft rotates at lower rotational speeds (rpms) that have frequencies in the range of the natural frequency of the crankshaft. When the rotational speed of the crankshaft approaches the natural frequency of vibration of the crankshaft itself, the rotational frequency amplifies/excites the natural frequency of vibration of the crankshaft, which results in a resonance condition. This resonance causes rigid body mode vibrations. In the absence of an isolator, these rigid body mode vibrations are transmitted unnecessarily to the FEAD, which can cause wear and damage to the components of the FEAD.

Some torsional vibration dampers also include an isolator system to reduce transmission of these rigid body modes of vibration to the FEAD. Some of these isolator systems use a rubber spring for isolation as well as for the vibration damper. Typically, these isolators are mold-bonded to another component of the torsional vibration damper and/or involve several moving components. Mold-bonding adds expense to the manufacturing process by requiring special equipment and time to accomplish the molding process. Elimination of this step or requirement would be beneficial. Additionally, minimizing the number of moving components in and reducing the overall cost of torsional vibration damper-isolators is beneficial. Accordingly, improved designs for torsional vibration dampers having isolators are needed.

SUMMARY

Disclosed herein are torsional vibration dampers having isolator members, collectively referred to herein as crankshaft damper-isolators or damper-isolators, that are cheaper and easier to manufacture and assemble. According to one aspect, a crankshaft damper-isolator includes: a hub having an outer radial surface and an outermost radial surface spaced radially outward from the outer radial surface, thereby defining an annular receptacle therebetween; a pulley body having a belt engaging portion radially-concentric about the hub and, extending radially inward from the belt engaging portion, a face guard that terminates in a sleeve seated about the outer radial surface of the hub; a damper assembly disposed between the outermost radial surface of the hub and belt engaging portion of the pulley body; and an isolator member seated in the annular receptacle of the hub. The isolator member is engaged with both the hub and the face guard for rotation therewith when the hub and pulley body rotate at the same rotational speed and when the hub rotates relative to the pulley body. The crankshaft damper-isolator also includes a slide bearing disposed between the outer radial surface of the hub and the sleeve of the pulley body. The slide bearing axially retains the pulley body to the hub and allows the pulley body to rotate relative to the hub.

In another aspect of the previous embodiments, the isolator member is an elastomeric isolator member. In one embodiment, the elastomeric isolator member is in an uncompressed state between the annular receptacle of the hub and the face guard of the pulley body. In another embodiment, the elastomeric isolator member is in a compressed state between the annular receptacle of the hub and the face guard of the pulley body.

In another aspect of the previous embodiments, the elastomeric isolator member defines one or more keyways in the front face and the back face thereof. The annular receptacle includes one or more keys shaped to mate with one of the one or more keyways in the front face of the elastomeric isolator member, and the face guard includes one or more keys shaped to mate with one of the one or more keyways in the back face of the elastomeric isolator member and are mated therewith. In one aspect of the previous embodiment, the annular receptacle and the face guard define one or more open windows adjacent to the one or more notch-shaped keys, and each of the one or more open windows receives a portion of the elastomeric isolator member therein.

In another aspect of the first embodiment, the isolator member is a torsion spring. In another aspect of the previous embodiment, the torsion spring is seated in the annular receptacle of the hub radially concentric about the outer radial surface thereof.

In another aspect of the previous two embodiments, the torsion spring includes a first end engaged with the hub for rotation therewith and a second end engaged with the pulley body for rotation therewith. In one aspect of the previous embodiment, the first end of the torsion spring is received in an aperture in the hub. In one embodiment, the aperture in the hub is disposed in a plate extending between the outer radial surface and the outermost radial surface of the hub, and the first end extends axially from the torsion spring and through the aperture in the plate. The aperture in the pulley body is disposed in the face guard, and the second end extends axially from the torsion spring and through the aperture in the face guard. In another embodiment, the second end of the torsion spring is received in an aperture in the pulley body.

In another aspect of a crankshaft damper-isolator having an isolator member that is a torsion spring, the hub includes a first abutment, and the first end of the torsion spring is seated with the first abutment. The pulley body includes a second abutment, and the second end of the torsion spring is seated with the second abutment.

In another aspect of the previous embodiments of a crankshaft damper-isolator having an isolator member that is a torsion spring, the torsion spring is a round wire spring or a flat wire spring. In another aspect of the previous embodiments, the hub includes a spring retention feature having a portion of the torsion spring seated therein.

In another aspect of any of the previous embodiments, the damper assembly includes an elastomeric damper member disposed in contact with the outer radial surface of the hub and an inertia member seated against the elastomeric damper member, thereby operably coupling the inertia member to the hub for rotation therewith.

In another aspect of any of the previous embodiments, the slide bearing is press-fit onto the hub and the sleeve is rotatable relative to the slide bearing and the hub. In another aspect of any of the previous embodiments, the slide bearing includes a locking mechanism providing axial rigidity to the crankshaft damper-isolator.

In another aspect, a front end accessory drive system includes a crankshaft damper-isolator according to any of the previous embodiments mounted to a crankshaft for rotation therewith.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Figure 1:
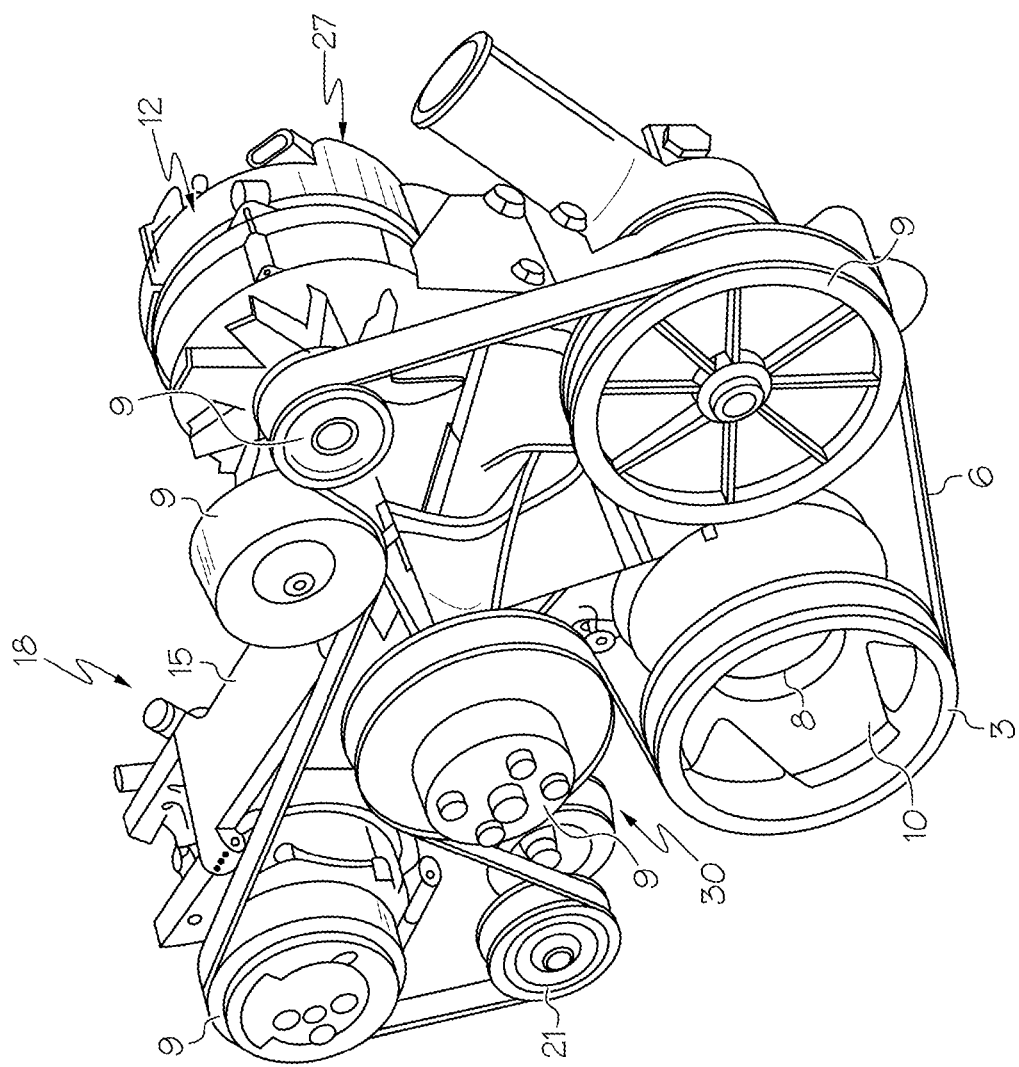
FIG. 1 is a perspective view of components in a front end accessory drive.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depends upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9, including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt. The endless drive belt 6 may be wound around the engine drive accessories 9, the alternator 12, and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12. The belt tensioner 21 automatically adjusts the tension of the endless drive belt 6 to keep it tight during operation and also prevent wear.

Figure 2:
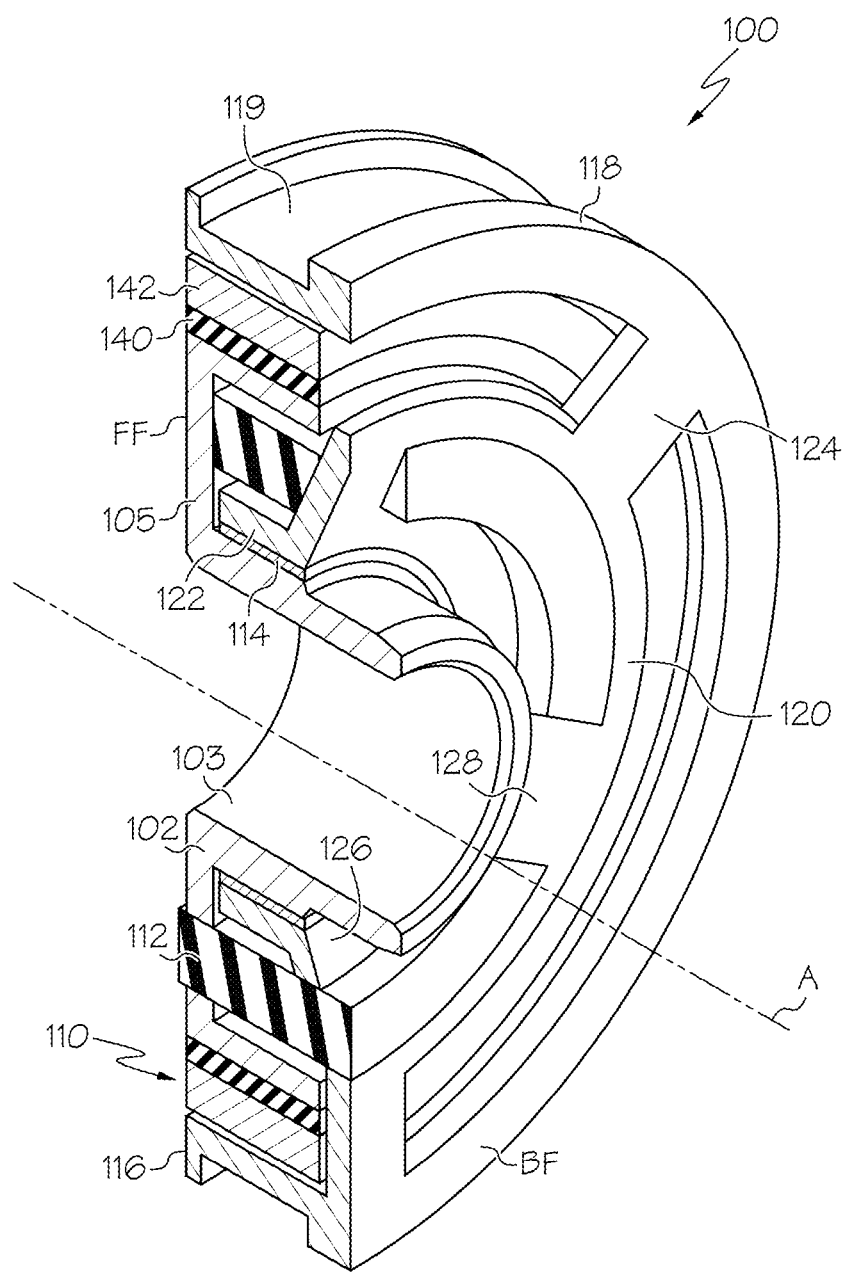
FIG. 2 is a longitudinal cross-section view of a torsional vibration damper having an interlocking isolator taken through and parallel with the axis of rotation.
Figure 3:
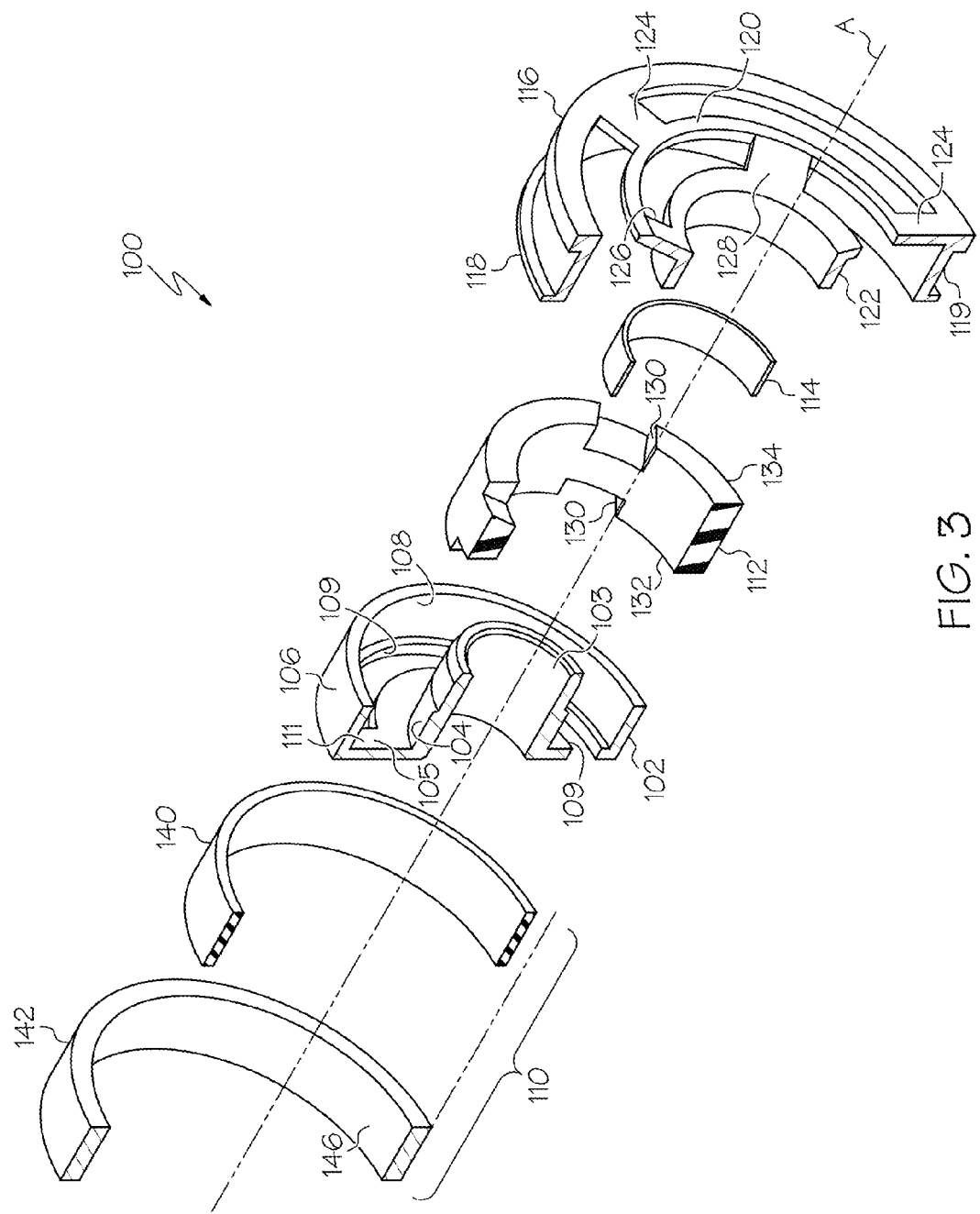
FIG. 3 is an exploded, unassembled perspective view of the torsional vibration damper of FIG. 2.
Figure 4:
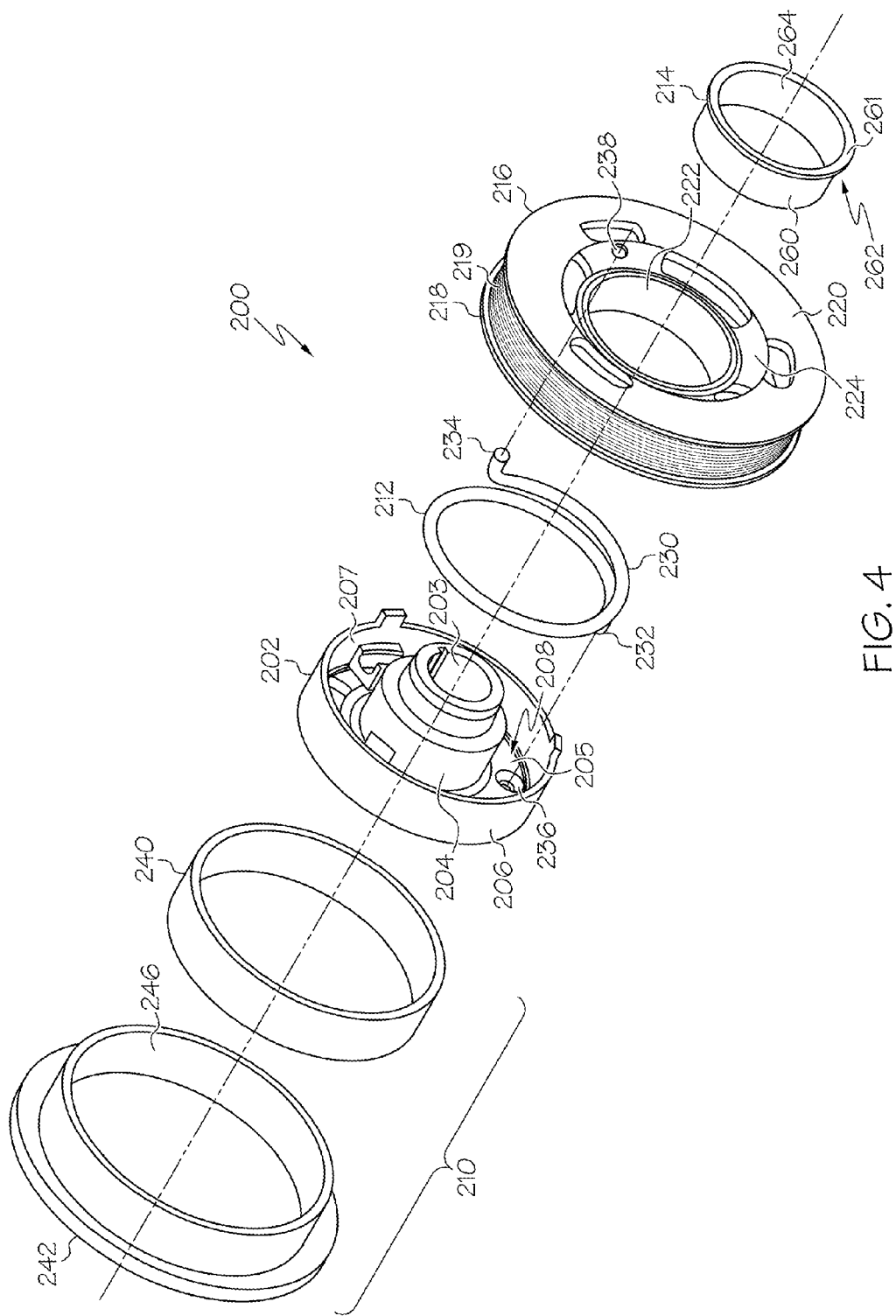
FIG. 4 is an exploded, unassembled perspective view of a torsional vibration damper having a spring isolator.
Figure 5:
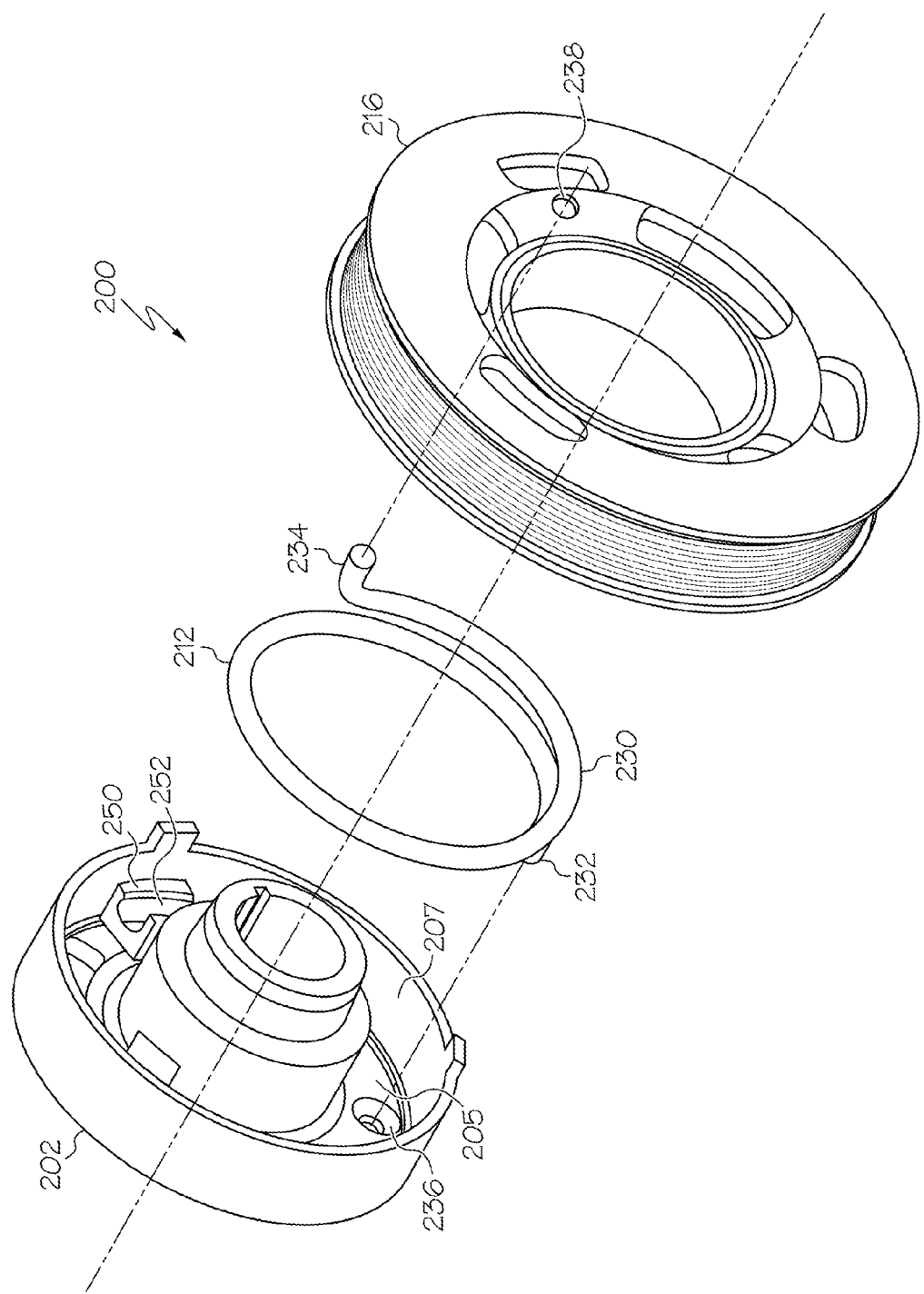
FIG. 5 is an enlarged exploded, unassembled perspective view of a portion of the torsional vibration damper of FIG. 4.

The improvement to the FEAD system 18 herein is a new crankshaft damper-isolator, generally designated by reference 100 in FIGS. 2 and 3 and reference 200 in FIGS. 4 and 5. The crankshaft damper-isolator 100 includes, as seen in FIG. 3 from bottom to top relative to the orientation of the drawing relative to the page, a damper assembly 110 to dampen and/or absorb the vibrational frequencies of a rotating member, such as a crankshaft; a hub 102; an elastomeric isolator member 112; a slide bearing 114; and a pulley body 116. The hub 102 is mountable to a crankshaft by receiving the crankshaft through its central bore 103.

The hub 102 has an outer radial surface 104 and an outermost radial surface 106 spaced radially outward from the outer radial surface 104 by a plate 105 to thereby define an annular receptacle 108 therebetween. The hub 102 may be cast, spun, forged, machined, or molded using known or hereinafter developed techniques. Suitable material for the hub includes, but is not limited to, iron, steel, aluminum, other suitable metals, plastics, or a combination thereof, including composite materials. The plate 105 may, as seen in FIG. 3, define one or more apertures or open windows 109 and includes one or more keys 111, which may also be a muntin between adjacent windows 109. The open windows 109 may each be arcuate since these may receive a portion of the elastomeric isolator member 112, which is an annular member, after assembly of the crankshaft damper-isolator. While the plate 105 is illustrated as having keys 111, the plate 105 could instead have one or more keyways for mating and interlocking with the elastomeric isolator member 112.

As seen in FIG. 2, the portion of the hub 102 defining the central bore 103 may extend axially in only one direction from the plate 105. Here, the plate 105 defines a front face FF of the crankshaft damper-isolator 100, which will receive the nose seal 10 (FIG. 1) fastening the crankshaft damper-isolator 100 to a shaft, such as a crankshaft, for rotation therewith. Accordingly, the face guard 120 of the pulley body 116 defines a back face BF of the crankshaft damper-isolator 100.

Still referring to FIGS. 2 and 3, the pulley body 116 includes a belt engaging portion 118 and a face guard 120 extending radially inward therefrom and terminating in a sleeve 122. The belt engaging portion 118 includes an outer belt engaging surface 119, which may be flat, contoured to receive a rounded belt, or have V-grooves for mating with the V-ribs of a V-ribbed belt or any other required contoured groove to mate with an endless belt. The face guard 120 may be attached to the belt engaging portion 118 by a plurality of spokes 124, which can reduce material costs. The face guard 120 may define one or more apertures or open windows 126 in the portion thereof that is between the sleeve 122 and the spokes 124. This portion of the face guard also includes one or more keys 128, which may also be a muntin between adjacent windows 126. The open windows 126 may each be arcuate since these may receive a portion of the elastomeric isolator member 112, which is an annular member, after assembly of the crankshaft damper-isolator. While the face guard 120 is illustrated as having keys 128, the face guard 120 could instead have one or more keyways for mating and interlocking with the elastomeric isolator member 112.

The elastomeric isolator member 112, as best seen in FIG. 3, includes or defines one or more keyways 130 in both the front face 132 and the back face 134 thereof. While the keyways are illustrated as generally rectangular notches recessed into the elastomeric isolator member 112, the keyways are not limited thereto. The keyways may have any configuration suitable to interlock the elastomeric isolator member 112 with the hub 102 and the pulley body 116. Moreover, rather than having keyways, the elastomeric isolator member 112 could instead have one or more keys shaped for mating with keyways of the hub 102 and the pulley body 116.

The elastomeric isolator member 112 can be constructed using any geometry and/or material as long as it provides the requisite torsional stiffness to function as an isolator of vibrations and it is successfully interlocked to the hub 102 and the pulley body 116. The elastomeric isolator member 112 itself does not have to be in compression, but merely interlocked into place to perform the isolation. In one embodiment, the elastomeric isolator member 112 is in an uncompressed state between the annular receptacle 108 of the hub 102 and the face guard 120 of the pulley body 116.

In another embodiment, the elastomeric isolator member 112 is in a compressed state between the annular receptacle 108 of the hub 102 and the face guard 120 of the pulley body 116.

The crankshaft damper-isolator 100 also includes a slide bearing 114 disposed between the outer radial surface 104 of the hub 102 and the sleeve 122 of the pulley body 116. The slide bearing 114 is press-fit onto the hub 102 and the sleeve 122 is rotatable relative to the slide bearing 114 and the hub 102, but only so much as the elastomeric isolator member 112 will allow. The slide bearing 114 may include a locking mechanism providing axial rigidity to the crankshaft damper-isolator 100. In one embodiment, the locking mechanism may be an L-shaped feature (not shown) where one of the legs of the "L" is sandwiched between the hub 102 and the pulley body 116 (parallel to axis A) and the other leg is perpendicular and abuts the pulley body 116.

Still referring to FIGS. 2 and 3, the damper assembly 110 includes an elastomeric damper member 140 disposed in contact with the outermost radial surface 106 of the hub and an inertia member 142 seated against the elastomeric damper member 140, thereby operably coupling the inertia member 142 to the hub 102 for rotation therewith. The inertia member 142 may be made from any material having a sufficient inertia, such as cast iron, steel, or similar dense material, for example. As illustrated in FIG. 2, the inertia member 142 is concentric with and spaced radially outward from the hub 102 such that the outermost radial surface 106 of the hub faces an inner surface 146 of the inertia member 142 and defines a gap therebetween. The elastomeric damper member 140 may be press fit or injected into this gap so as to non-rigidly couple the hub 102 and the inertia member 142.

The elastomeric damper member 140 may be any suitable elastomer to absorb and/or dampen the torsional vibrations generated by a rotating shaft upon which the crankshaft damper-isolator 100 is mounted. The elastomeric members (e.g., elastomeric damper member 140 and/or elastomeric isolator member 112) may have a generally low tensile modulus and high yield strain. The elastomer is preferably one suitable for automotive engine applications, i.e., suitable to withstand temperatures experienced in the engine and road temperatures and conditions. The elastomeric damper member 140 may, however, be as disclosed in U.S. Pat. No. 7,658,127, which is incorporated herein, in its entirety, by reference. In one embodiment, the elastomeric members (e.g., elastomeric damper member 140 and/or elastomeric isolator member 112) may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric members 140, 112 may be a composite material that optionally includes a plurality of fibers dispersed therein. The fibers may be continuous or fragmented (chopped) aramid fiber like the fiber sold under the name TECHNORA® fiber. In one embodiment, the elastomeric damper member 140 may be attached to the outermost radial surface 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Once assembled, as shown in FIG. 2, the damper assembly 110 is disposed between the outermost radial surface 106 of the hub 102 and the belt engaging portion 118 of the pulley body 116 and the elastomeric isolator member 112 is seated between the annular receptacle 108 of the hub 102 and the face guard 120 of the pulley body 116. When seated between the hub 102 and the pulley body 116, the elastomeric isolator member 112 may be encapsulated by the annular receptacle 108 of the hub 102 and interlocked with the hub 102 and the pulley body 116. The belt engaging portion 118 is also radially-concentric about the hub 102, and the pulley body's sleeve 122 is seated about the outer radial surface 104 of the hub 102, more particularly, sleeve 122 is seated about the slide bearing 114 press-fit to the outer radial surface 104 of the hub 102. As noted above, the elastomeric isolator member 112 may be in an uncompressed state or in a compressed state upon seating the elastomeric isolator member 112 between the annular receptacle of the hub and the face guard of the pulley body.

The crankshaft damper-isolator disclosed herein eliminates the need for mold-bonding and reduces the number of components, which reduces the cost of manufacturing the damper-isolators, among other benefits.

Referring now to FIGS. 4 and 5, the crankshaft damper-isolator 200 includes, as seen in FIG. 4 from left to right relative to the orientation of the drawing relative to the page, a damper assembly 210 to dampen and/or absorb the vibrational frequencies of a rotating member, such as a crankshaft; a hub 202; a torsion spring isolator 212; a pulley body 216; and a slide bearing 214. The hub 202 is mountable to a crankshaft by receiving the crankshaft through its central bore 203.

The hub 202 has an outer radial surface 204 and an outermost radial surface 206 spaced radially outward from the outer radial surface 204 by a plate 205 to thereby define an annular receptacle 208 therebetween. The outermost radial surface 206 may have an opposing inner radial surface 207 defining a portion of the annular receptacle 208. The hub 202 may be cast, spun, forged, machined, or molded using known or hereinafter developed techniques. Suitable material for the hub includes, but is not limited to, iron, steel, aluminum, other suitable metals, plastics, or a combination thereof, including composite materials. As shown in FIGS. 4 and 5, the plate 205 has an aperture 236 for engagement of the torsion spring 212 with the hub 202. In one embodiment, the plate 205 may also have one or more supplemental apertures (not shown) for reducing material costs, among other purposes. The hub 202 may also have structures or apertures (not shown) incorporated with the outer radial surface 204 or the inner radial surface 207 for engagement with the torsion spring 212. In one embodiment (not shown), the hub 202 may have a first abutment (referred to herein in the alternative as a spring engagement surface) to engage with the torsion spring 212.

As shown in FIG. 5, the plate 205 may have one or more spring retention features 250 disposed within the annular receptacle 208 of the hub 202. In one embodiment, the spring retention feature 250 may, among other functions, maintain the torsion spring 212 in an orientation generally concentric about the outer radial surface 204 of the hub 202. In one embodiment, the spring retention feature 250 may include a channel 252 into which the torsion spring 212 is seated. The spring retention feature 250 may be a separate piece coupled to the plate 250 or may be directly incorporated (cast, forged, machined, molded) as part of the plate 205. In one embodiment, the spring retention feature 250 may be coupled or incorporated into the outer radial surface 204 or the inner radial surface 207 of the hub 202 and protrude into the annular receptacle 208 of the hub 202.

As seen in FIG. 4, the portion of the hub 202 defining the central bore 203 may extend axially in only one direction from the plate 205. Here, the plate 205 defines a front face FF of the crankshaft damper-isolator 200, which will receive the nose seal 10 (FIG. 1) fastening the crankshaft damper-isolator 200 to a shaft, such as a crankshaft, for rotation therewith. Accordingly, a face guard 220 of the pulley body 216 defines a back face BF of the crankshaft damper-isolator 200.

Referring to FIGS. 4 and 5, the pulley body 216 includes a belt engaging portion 218 and a face guard 220 extending radially inward therefrom and terminating in a sleeve 222. The belt engaging portion 218 includes an outer belt engaging surface 219, which may be flat, contoured to receive a rounded belt, or have V-grooves for mating with the V-ribs of a V-ribbed belt, or any other required contoured groove to mate with an endless belt. The pulley body 216 has an aperture 238 for engagement with the torsion spring 212. The aperture 238 for engagement with the torsion spring 212 may be positioned in the face guard 220, sleeve 222, or belt engaging portion 218 of the pulley body 216. In one embodiment, the aperture 238 is disposed in the face guard 220 of the pulley body 216. In one embodiment (not shown), the pulley body 216 may have a second abutment (referred to herein in the alternative as a spring engagement surface) to engage with the torsion spring 212. The face guard 220 may be attached to the belt engaging portion 218 by a plurality of spokes 224, which may reduce material costs. In a pulley body 216 having a plurality of spokes 224 coupling the face guard 220 to the belt engaging portion 218, the aperture 238 for engagement with the torsion spring 212 may be disposed in one of the plurality of spokes 224 or in a portion of the face guard 220 that is between the sleeve 222 and the plurality of spokes 224.

Still referring to FIGS. 4 and 5, the torsion spring 212 (referred to herein as spring 212 in the alternative) is seated in the annular receptacle 208 of the hub 202. The spring 212 is generally radially concentric about the outer radial surface 204 of the hub 202 and is engaged with the hub 202 and the pulley body 216 for rotation therewith. The spring 212 may have a first end 232 engaged with the hub 202 and a second end 234 engaged with the pulley body 216. In one embodiment, the first end 232 may engage with the hub 202 through the aperture 236 in the hub 202 and engage with the pulley body 216 through the aperture 238 in the pulley body 216. Aperture 236 of the hub 202 holds a first end 232 of the spring 212 in place in its engagement with the hub 202. Aperture 238 of the pulley body 216 holds a second end 234 in place in its engagement with the pulley body 216. In one embodiment, aperture 236 in the hub 202 prevents the first end 232 of the spring 212 from disengaging from the hub 202 and moving independent of the hub 202, and aperture 238 in the pulley body 216 prevents the second end 234 of the spring 212 from disengaging from the pulley body 216 and moving independent of the pulley body 216. Engagement of the spring 212 with the hub 202 and the pulley body 216 allows the spring 212 to rotate with the hub 202 and the pulley body 216 when hub 202 and the pulley body 216 are rotating at the same rotational speed and also when the hub 202 rotates at a speed different relative to the pulley body 216, such as when the crankshaft 8 experiences rigid body mode vibrations during start-up and shutdown conditions, for example.

The spring 212 may be constructed using any geometry and/or material as long as it provides the requisite torsional stiffness to function as an isolator of vibrations and is successfully engaged with the hub 202 and the pulley body 216. In one embodiment, the spring 212 has a first end 232 configured to engage with the hub 202, a second end 234 configured to engage with the pulley body 216, and a torsion portion 230 extending between the first end 232 and second end 234. The spring 212 may be a torsion spring, including, but not limited to, a round wire spring, rectangular wire spring, or flat wire spring, for example. The torsion portion 230 may include one or more full turns and/or one or more partial turns about a center axis of the coil spring 212. In one embodiment, the torsion portion 230 may have one full turn and one partial turn that is less than a full turn. In another embodiment, the spring 212 may have less than a full coil. The first end 232 may extend at a generally right angle from the torsion portion 230 in an axial direction for engagement with the hub, and the second end 234 may extend at a generally right angle from the torsion portion 230 in an axial direction opposite the first end 232 for engagement with the pulley body 216. One or both of the first end 232 and second end 234 may also extend at a generally right angle radially outward or inward from the torsion portion 230 to engage with alternative placements of aperture 236 in the hub 202 and aperture 238 in the pulley body 216.

Suitable materials for the spring 212 may include, but are not limited to, iron, steel, brass, aluminum, other suitable metals, metal alloys, plastics, or a combination thereof, including composite materials. The spring 212 may have a torsional spring rate that is stiff enough to withstand the torque generated by the crankshaft on the crankshaft damper-isolator 200 and soft enough for the spring 212 to be an effective isolator by allowing an effective range of rotation of the pulley body 216 relative to the hub 202.

As shown in FIGS. 4 and 5, the first end 232 of the spring 212 engages with the aperture 236 of the hub 202 such that the first end 232 rotates with the hub 202, allowing rotation of the spring 212 with the hub 202. The second end 234 of the spring 212 engages with the aperture 238 of the pulley body 216 such that the second end 234 rotates with the pulley body 216, allowing rotation of the spring 212 with the pulley body 216. The spring 212 may have an unwound state, in which the spring 212 is not under torsional tension, and a wound state, in which the spring 212 is acted upon by a torsional force.

Operation of the spring 212 to isolate the pulley body 216 from rigid body mode vibrations of the crankshaft 8 and hub 202 is now described with reference to FIGS. 1, 4 and 5. When the torsional damper-isolator 200 and crankshaft 8 are not rotating, the spring 212 is in an unwound state. When the crankshaft 8 starts to turn and imparts rotational energy on torsional damper-isolator 200, the hub 202 begins to rotate while the pulley body 216, which is subject to the inertia of the pulley body 216, the belt 6, and the FEAD system 18, initially remains stationary. By engagement with the first end 232, the hub 202 exerts a torsional force on the spring 212, which winds the spring 212 such that the spring 212 is in a wound state. The spring 212, in the wound state, translates the torsional force to the pulley body 216 through the engagement of the second end 234 with the aperture 238 in the pulley body 216. At a threshold wound state of the spring 212, the torsional force exerted on the pulley body 216 by the second end 234 of the spring 212 overcomes the inertia of the pulley body 216 and the belt 6, and the pulley body 216 begins to rotate in the same direction as the hub 202.

The inertia of the pulley body 216 and the belt 6 relative to the hub 202 maintains the spring 212 in a wound state while the crankshaft 8 is rotating. In a wound state, the spring 212 exerts a spring force on the hub 202 and the pulley body 216 as the spring 212 attempts to return to its original unwound state. As the rotational speed of the crankshaft 8 approaches the natural frequency of vibration of the crankshaft 8, the frequency of rotation amplifies, or resonates with, the natural frequency of vibration of the crankshaft 8 itself, which causes rigid body mode vibrations in the form of oscillations in the rotational speed of the crankshaft 8. These vibrations/oscillations are transmitted to the hub 202 through its rigid engagement with the crankshaft 8. Oscillations in the rotational speed of the hub 202 cause the spring 212 to oscillate between a winding condition and an unwinding condition. As the rotational speed of the hub 202 changes, the rotational acceleration of the hub 202 changes, which varies a force exerted on the spring 212 by the hub 202, and a degree of winding of the spring 212 changes. A change in the degree of winding of the spring 212 changes the spring force exerted by the spring 212. These changes in spring force counteract the changes in the force exerted by the hub 202 on the spring 212 that result from the rigid body mode vibrations of the crankshaft 8, thereby isolating the pulley body 216 from the rigid body mode vibrations of the crankshaft 8.

Once the crankshaft reaches its operation speed, the pulley body 216 rotates at a rotational speed generally similar to the rotational speed of the hub 202. Though the rotational speeds are generally the same, the inertia of the belt and the pulley body 216 cause the spring 212 to remain generally in a wound state. The degree that the spring 212 is wound oscillates about an equilibrium wound state due to the rhythmic torque applied by the engine. The equilibrium wound state is generally less than the maximum wound state experienced during initial startup of the crankshaft 8. During deceleration of the crankshaft 8, the rotational speed of the crankshaft 8 decreases until the frequency of rotation again approaches the natural frequency of vibration of the crankshaft 8. As with the start-up condition, oscillation of the spring 212 between winding and unwinding conditions in response to the oscillations in the rotational speed of the hub changes the spring force of the spring to counteract oscillations in the force exerted by the hub 202 on the spring 212, thereby isolating the pulley body 216 from the rigid body mode vibrations of the crankshaft 8.

The crankshaft damper-isolator 200 also includes a slide bearing 214 disposed between the outer radial surface 204 of the hub 202 and the sleeve 222 of the pulley body 216. The slide bearing 214 may be press-fit onto the hub 202, and the sleeve 222 is rotatable relative to the slide bearing 214 and the hub 202, the degree of rotation subject to a range of rotation allowable by the spring 212. The slide bearing 214 has an outer radial surface 260 and an inner radial surface 264. The slide bearing 214 may have a flange 261 having a flange inner surface 262. A cross-section of the slide bearing 214 may be L-shaped, wherein the radial surfaces 260, 264 of the slide bearing define one arm of the L in the axial direction and the flange 261 extends generally perpendicular to the radial surfaces in a radial direction outward from the outer radial surface 260. The slide bearing 214 may be press-fit onto the hub 202 such that the inner radial surface 264 engages with the outer radial surface 204 of the hub 202 and the flange 261 engages the face guard 220 of the pulley body 216. The outer radial surface 260 of the slide bearing 214 and the flange inner surface 262 may be reduced friction surfaces to facilitate movement of the sleeve 222 relative to the outer radial surface 260 of the slide bearing 214 and facilitate rotation of the pulley body 216 relative to the flange inner surface 262. The slide bearing 214 may include a locking mechanism providing axial rigidity to the crankshaft damper-isolator 200.

Still referring to FIGS. 4 and 5, the damper assembly 210 includes an elastomeric damper member 240 disposed in contact with the outermost radial surface 206 of the hub and an inertia member 242 seated against the elastomeric damper member 240 thereby operably coupling the inertia member 242 to the hub 202 for rotation therewith. The inertia member 242 may be made from any material having a sufficient inertia, usually cast iron, steel, or similar dense material. As illustrated in FIG. 4, the inertia member 242 is concentric with and spaced radially outward from the hub 202 such that the outermost radial surface 206 of the hub faces an inner surface 246 of the inertia member 242 and defines a gap therebetween. The elastomeric damper member 240 may be press fit or injected into this gap so as to non-rigidly couple the hub 202 and the inertia member 242.

The elastomeric damper member 240 may be any suitable elastomer to absorb and/or dampen the torsional vibrations generated by a rotating shaft upon which the crankshaft damper-isolator 200 is mounted. The elastomeric members may have a generally low tensile modulus and high yield strain. The elastomer is preferably one suitable for automotive engine applications, i.e., suitable to withstand temperatures experienced in the engine and road temperatures and conditions. The elastomeric damper member 240 may, however, be as disclosed in U.S. Pat. No. 7,658,127, which is incorporated herein, in its entirety, by reference. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber. In one embodiment, the elastomeric damper member 240 may be attached to the outermost radial surface 206 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Once assembled, the damper assembly 210 is disposed between the outermost radial surface 206 of the hub 202 and the belt engaging portion 218 of the pulley body 216, and the spring 212 is seated in the annular receptacle 208 of the hub 202, enclosed therein by the face guard 220 of the pulley body 216, and engaged with the hub 202 and the pulley body 216, as explained above. The belt engaging portion 218 is also radially-concentric about the hub 202 and the pulley body's sleeve 222 is seated about the outer radial surface 204 of the hub 202, more particularly, sleeve 222 is seated about the slide bearing 214 press-fit to the outer radial surface 204 of the hub 202.

The crankshaft damper-isolator disclosed herein reduces the number of components, which may reduce the cost of manufacturing, among other benefits.

Although the invention is shown and described with respect to certain embodiments, it is obvious that modifications will occur to those skilled in the art upon reading and understanding the specification, and the present invention includes all such modifications.

What is claimed is:

1. A crankshaft damper-isolator comprising:
   a hub having an outer radial surface and an outermost radial surface spaced radially outward from the outer radial surface and thereby defining an annular receptacle therebetween;
   a pulley body having a belt engaging portion radially-concentric about the hub and, extending radially inward from the belt engaging portion, a face guard that terminates in a sleeve seated about the outer radial surface of the hub;
   a damper assembly disposed between the outermost radial surface of the hub and belt engaging portion of the pulley body;
   an isolator member seated in the annular receptacle of the hub, wherein the isolator member is engaged with both the hub and the face guard for rotation therewith when the hub and pulley body rotate at the same rotational speed and when the hub rotates relative to the pulley body; and
   a slide bearing disposed between the outer radial surface of the hub and the sleeve of the pulley body, wherein the slide bearing axially retains the pulley body to the hub and allows the pulley body to rotate relative to the hub.

2. The crankshaft damper-isolator of claim 1, wherein the isolator member is an elastomeric isolator member.

3. The crankshaft damper-isolator of claim 2, wherein the elastomeric isolator member is in an uncompressed state between the annular receptacle of the hub and the face guard of the pulley body.

4. The crankshaft damper-isolator of claim 2, wherein the elastomeric isolator member is in a compressed state between the annular receptacle of the hub and the face guard of the pulley body.

5. The crankshaft damper-isolator of claim 2, wherein the elastomeric isolator member defines one or more keyways in the front face and the back face thereof and the annular receptacle includes one or more keys shaped to mate with one of the one or more keyways in the front face of the elastomeric isolator member and the face guard includes one or more keys shaped to mate with one of the one or more keyways in the back face of the elastomeric isolator member and are mated therewith.

6. The crankshaft damper-isolator of claim 5, wherein each of the annular receptacle and the face guard define one or more open windows adjacent to the one or more notch-shaped keys;
   wherein each of the one or more open windows receives a portion of the elastomeric isolator member therein.

7. The crankshaft damper-isolator of claim 1, wherein the isolator member is a torsion spring.

8. The crankshaft damper-isolator of claim 7, wherein the torsion spring is seated in the annular receptacle of the hub radially concentric about the outer radial surface thereof.

9. The crankshaft damper-isolator of claim 7, wherein the torsion spring further comprises:
   a first end engaged with the hub for rotation therewith; and
   a second end engaged with the pulley body for rotation therewith.

10. The crankshaft damper-isolator of claim 9, wherein the first end of the torsion spring is received in an aperture in the hub.

11. The crankshaft damper-isolator of claim 10, wherein the aperture in the hub is disposed in a plate extending between the outer radial surface and the outermost radial surface of the hub and the first end extends axially from the torsion spring and through the aperture in the plate, and wherein an aperture in the pulley body is disposed in the face guard and the second end extends axially from the torsion spring and through the aperture in the face guard.

12. The crankshaft damper-isolator of claim 9, wherein the second end of the torsion spring is received in an aperture in the pulley body.

13. The crankshaft damper-isolator of claim 9 wherein the hub further comprises a first abutment and the first end of the torsion spring is seated with the first abutment, and wherein the pulley body further comprises a second abutment and the second end of the torsion spring is seated with the second abutment.

14. The crankshaft damper-isolator of claim 7 wherein the torsion spring is a round wire spring or a flat wire spring.

15. The crankshaft damper-isolator of claim 7 wherein the hub further comprises a spring retention feature having a portion of the torsion spring seated therein.

16. The crankshaft damper-isolator of claim 1, wherein the damper assembly comprises:
    an elastomeric damper member disposed in contact with the outer radial surface of the hub; and
    an inertia member seated against the elastomeric damper member thereby operably coupling the inertia member to the hub for rotation therewith.

17. The crankshaft damper-isolator of claim 1, wherein the slide bearing is press-fit onto the hub and the sleeve is rotatable relative to the slide bearing and the hub.

18. The crankshaft damper-isolator of claim 17, wherein the slide bearing includes a locking mechanism providing axial rigidity to the crankshaft damper-isolator.

19. A front end accessory drive system comprising the crankshaft damper-isolator of claim 1 mounted to a crankshaft for rotation therewith.

* * * * *